(12) United States Patent
Mueller-Niehuus et al.

(10) Patent No.: US 9,915,348 B2
(45) Date of Patent: Mar. 13, 2018

(54) WIPER

(71) Applicant: Carl Freudenberg KG, Weinheim (DE)

(72) Inventors: Kristian Mueller-Niehuus, Frankfurt (DE); Hans-Werner Guenther, Drakenburg (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 15/098,331

(22) Filed: Apr. 14, 2016

(65) Prior Publication Data

US 2016/0305546 A1    Oct. 20, 2016

(30) Foreign Application Priority Data

Apr. 15, 2015   (DE) .................. 10 2015 105 737

(51) Int. Cl.
*F16J 15/3232* (2016.01)
*F16J 15/16* (2006.01)

(52) U.S. Cl.
CPC .......... *F16J 15/3232* (2013.01); *F16J 15/164* (2013.01)

(58) Field of Classification Search
CPC ...... F16J 15/3232; F16J 15/164; F16J 15/206; F16J 15/203
See application file for complete search history.

(56) References Cited

U.S. PATENT DOCUMENTS

| | | | | |
|---|---|---|---|---|
| 2,237,758 A | * | 4/1941 | Kurzweil | F16J 15/3232 277/556 |
| 2,274,234 A | * | 2/1942 | Ekkebus | F16J 15/3232 277/555 |
| 2,676,040 A | * | 4/1954 | Dalton | F16J 15/3232 277/563 |
| 3,345,076 A | * | 10/1967 | Wheelock | F16J 15/3204 15/104.001 |
| 3,942,805 A | * | 3/1976 | Sundqvist | F16J 15/40 277/431 |
| 3,955,859 A | * | 5/1976 | Stella | F16J 15/324 277/552 |
| 4,371,177 A | * | 2/1983 | Bahr | F16J 15/3236 277/560 |
| 4,582,330 A | * | 4/1986 | Lew | F16J 15/025 277/330 |
| 5,303,935 A | * | 4/1994 | Saksun | F16J 15/3224 277/567 |
| 5,421,591 A | * | 6/1995 | Katzensteiner | B60K 17/306 277/550 |

(Continued)

FOREIGN PATENT DOCUMENTS

| | | |
|---|---|---|
| CH | 446835 A | 11/1967 |
| DE | 29706270 U1 | 9/1997 |

(Continued)

*Primary Examiner* — Eugene G Byrd
(74) *Attorney, Agent, or Firm* — Leydig, Voigt & Mayer, Ltd.

(57) ABSTRACT

A wiper for the sealing arrangement of a cylinder arrangement having a cylinder and a piston rod, having a support lip facing in the direction of the space that is to be sealed off, and a wiper lip facing towards the surroundings, as well as a holding element from which the support lip and the wiper lip protrude, wherein the free end of the wiper lip is bent in the direction of the piston rod.

19 Claims, 2 Drawing Sheets

(56) References Cited

U.S. PATENT DOCUMENTS

| | | | |
|---|---|---|---|
| 7,069,806 B2* | 7/2006 | Balamucki | F16H 63/3023 277/353 |
| 7,083,170 B2* | 8/2006 | Borstel | F16J 15/164 277/459 |
| 7,717,432 B2* | 5/2010 | Kondo | F02M 59/442 277/353 |
| 8,297,626 B2* | 10/2012 | Schaefer | F16J 15/025 102/469 |
| 2003/0178786 A1* | 9/2003 | Siegrist | F16J 15/3236 277/549 |
| 2004/0119241 A1* | 6/2004 | Castleman | F16J 15/3236 277/436 |
| 2004/0135320 A1* | 7/2004 | Schultze | F16J 15/3232 277/436 |
| 2008/0007012 A1* | 1/2008 | Jeong | F15B 15/1433 277/510 |
| 2009/0152779 A1* | 6/2009 | Imoto | F16F 9/36 267/129 |
| 2011/0006486 A1* | 1/2011 | Niknezhad | F16J 15/3212 277/562 |
| 2012/0326396 A1* | 12/2012 | Ajiki | F16J 15/002 277/562 |
| 2013/0234402 A1* | 9/2013 | Fietz | F16J 15/002 277/549 |

FOREIGN PATENT DOCUMENTS

| | | |
|---|---|---|
| DE | 19825428 A1 | 12/1999 |
| EP | 0050949 A1 | 5/1982 |
| EP | 0104504 A1 | 4/1984 |
| EP | 1266157 B1 | 12/2002 |
| EP | 1818579 A1 | 8/2007 |
| WO | WO 2016104164 A1 | 6/2016 |

* cited by examiner

WIPER

CROSS-REFERENCE TO RELATED APPLICATIONS

Priority is claimed to German Patent Application No. DE 10 2015 105 737.9, filed on Apr. 15, 2015, the entire disclosure of which is hereby incorporated by reference herein.

FIELD

The invention relates to a wiper for the sealing arrangement of a cylinder arrangement having a cylinder and a piston rod.

BACKGROUND

Cylinder arrangements consisting of a cylinder and a piston rod, especially in the case of a hydraulic cylinder arrangement having a hydraulic cylinder, are often employed for translatory force transmission. Such cylinder arrangements are sealed off vis-à-vis the surroundings by means of a usually multi-part sealing arrangement. In this context, part of the sealing arrangement consists of a wiper that seals off the sealing arrangement towards the surroundings. The task of the wiper is to strip off dirt, foreign particles and moisture from the piston rod as it enters the hydraulic cylinder. This prevents moisture or dirt from penetrating the sealing arrangement where it could cause premature wear and tear.

In this context, the wiper can be configured so as to be single-action or dual-action. A single-action wiper only has a wiper lip facing towards the surroundings. This lip keeps away impurities from the outside and prevents them from getting into the sealing arrangement. Dual-action wipers have a wiper lip facing towards the surroundings as well as a support lip facing in the direction of the space that is to be sealed off. On the one hand, the support lip brings about an improvement of the tilting stability of the wiper, which is mounted in a groove of the hydraulic cylinder. On the other hand, the support lip enhances the function of the sealing arrangement since the support lip strips off residues of hydraulic fluid that have passed through the sealing arrangement and keeps them inside the sealing arrangement. Such a dual-action wiper is disclosed, for example, in European patent specification EP 1 266 157 B1.

As already elaborated upon, the wiper is installed in a groove of the hydraulic cylinder, whereby the wiper lip and the support lip come into contact with the piston rod under radial pretension. However, when the piston rod is deflected radially under the effect of transverse forces, the installation space of the wiper changes, especially the gap between the cylinder and the piston rod. The gap becomes smaller on the deflected side of the piston rod and larger on the stressed side of the piston rod. The wipers known from the state of the art, however, are only capable of compensating for this deflection within the range of a few tenths of a millimeter. In the case of larger deflections, the wiper lip is no longer in contact with the entire circumference of the piston rod or else it is deformed to such a large extent that it can no longer strip off impurities over the entire circumference.

If, in order to solve this problem, the wipers are made of a softer material so that they can compensate for larger deflections of the piston rods, the lips of the wiper have to be configured relatively thick if they are very long so as to ensure contact of the wiper lip with the piston rod. When the available installation spaces are small, this causes severe deformations of the wiper lip, along with wide areas of contact with the piston rod. This results in high contact forces and undesired high friction.

SUMMARY

An aspect of the invention provides a wiper for a sealing arrangement of a cylinder arrangement having a cylinder and a piston rod, the wiper comprising: a support lip facing in a direction of a space that is to be sealed off; a wiper lip facing towards surroundings; and a holding element from which the support lip and the wiper lip protrude, wherein a free end of the wiper lip is bent in a direction of the piston rod.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
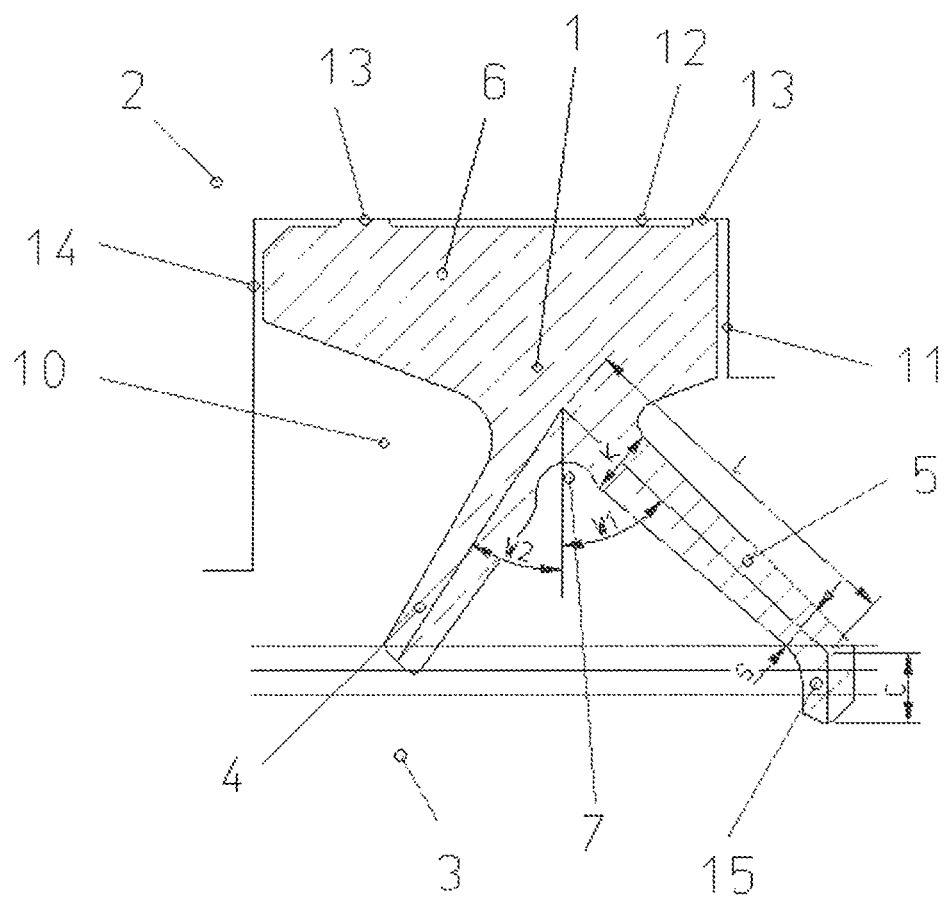
FIG. 1 a wiper in a sectional view.

An aspect of the invention relates to a wiper for the sealing arrangement of a cylinder arrangement having a cylinder and a piston rod, comprising a support lip facing in the direction of the space that is to be sealed off, and a wiper lip facing towards the surroundings, as well as a holding element from which the support lip and the wiper lip protrude.

An aspect of the invention is based on putting forward a wiper for the sealing arrangement of a cylinder arrangement which can reliably strip off impurities even in the case of large deflections the piston rod.

In an aspect of the invention, the free end of the wiper lip is bent in the direction of the rod. As a result, the wiper lip forms a shoulder that is situated before the contact zone with the piston rod a that preferably runs in the radial plane when it is in the unassembled state. This ensures that the point where the wiper lip makes contact with the piston rod is always in the area of the free end of the wiper lip. The entire length of the wiper lip can be utilized to compensate for eccentricities or position changes of the piston rod relative to the cylinder so as to always ensure a uniform stripping performance. Since the free end of the wiper lip is bent in the direction of the rod, the wiper lip can be configured so as to be relatively long and thin. It is always ensured that the area of the free end of the wiper lip comes into contact with the piston rod. In particular, the configuration according to the invention can prevent the wiper lip from having an undesired area of contact, for example, in the center of the wiper lip, when it buckles.

The support lip has the function of compensating for the tilting torque of the wiper lip and stabilizing the holding element in the installation space. For this purpose, the support lip generates a counter torque and keeps the hydraulic medium in the sealing space when the piston rod is being extended. In this context, however, the support lip can be configured in such a way that the function of the support lip is not present in the entire area of radial deflection that is permissible for the wiper lip. As a result, the support lip can be configured so as to be relatively short. Otherwise, there would be detrimental effects, especially in terms of the dimension of the wiper.

At just a few tenths of a millimeter, the contact surface of the wiper lip with the piston rod is very small, irrespective of the eccentricity of the piston rod. This translates into a high contact pressing force in the area of a very narrow contact zone. The result is a good stripping action, along with low friction forces. This make it possible to integrate a dual-action wiper with a wiper lip and with a support lip into small installation spaces, whereby the wiper lip can compensate for a large deflection of the piston rod, thereby creating only a very small contact zone with the piston rod. The pressing force of the wiper lip in the area of the contact zone is high, so that a good stripping action can be achieved, along with a low level of friction.

The ratio of the length to the mean thickness of the wiper lip is preferably greater than 5. As a result, the wiper lip is configured so as to be long and thin in comparison to the wipers known from the state of the art. In this context, it is advantageous that the wiper lip can therefore bridge a high eccentricity and that contact to the piston rod is ensured at all times. Since the wiper lip is bent at its free end in the direction of the rod, however, it is ensured that the wiper lip does not buckle and already comes into contact with the piston rod before the desired point of contact. A particularly good compensation performance for eccentricity, along with a uniform and good stripping performance, are obtained when the length-to-thickness ratio of the wiper lip is between 7 and 8.

Preferably, the wiper is made of polyurethane (PU). Polyurethane is resistant to hydraulic fluids and displays favorable friction behavior while being highly wear-resistant. As an alternative, however, it is likewise conceivable for the wiper to be made of an elastomer, of polyethylene (PE) or of polyamide (PA).

The holding element can alternatively be made of another material than that of the wiper lip and the support lip. In this embodiment, the wiper is made as a single piece but it consists of several materials. In another alternative embodiment, the holding element, the wiper lip and support lip are configured so as to be made up of multiple parts.

The wiper is preferably made of a material having a hardness greater than 95 Shore A, preferably a hardness of 98 Shore A. As a result, in contrast to the wipers known from the state of the art, the wiper here is made of a comparatively hard material. This means that the wiper lip, with its long and narrow configuration, only exhibits slight buckling, whereby, due to its geometry, the wiper lip is nevertheless even capable of compensating for larger deflections of the piston rod. Owing to the high degree of hardness, however, it can be prevented that the thin wiper lip buckles and thus creates undesired contact areas.

The holding element can have a relief groove between the support lip and the wiper lip. This translates into an improved functional separation between the wiper lip and the support lip, so that, for instance, the softness of both lips can be selected independently from each other. Altogether, the wiper lip and the support lip are softer due to the relief groove, as a result of which the contact force exerted on the piston rod is reduced.

Part of the holding element forms a pressure-relief lip which extends towards the surroundings and whose free end is supported on the cylinder. One function of the pressure-relief lip is to improve the sealing of the wiper and to additionally stabilize the holding element in the installation space by absorbing the tilting torque.

The holding element can have a cutout extending from the surface facing the interior of the cylinder arrangement all the way to the surface of the holding element facing towards the surroundings. This creates a passage leading from the sealing space to the surroundings. Therefore, an interaction with the pressure-relief lip gives rise to the function of an excess-pressure valve. The pressure-relief lip makes contact under pretension with the housing of the cylinder. As soon as the pressure in the space between the sealing arrangement and the wiper has exceeded a prescribed value, the pressure-relief lip is lifted in order to compensate for the excess pressure, so that surplus medium can escape. In this process, it is always ensured that the wiper lip is in contact with the piston rod and can fulfill its function there. In this embodiment, the excess pressure, which would lead to an undesired lifting of the wiper lip, is compensated for by the pressure-relief lip. The cutout can be in the form of a hole.

The holding element can have encircling projections on the side facing away from the piston rod. These projections can be configured in the form of an encircling bead. Preferably, there are two encircling projections. This yields two defined short contact lines in the installation space. The pressing force increased in this manner translates into more reliable tightness.

The free end of the wiper lip can taper to form a point. Towards this end, the free end of the wiper lip can be configured so as to be triangular. In this context, it is advantageous to ensure a linear contact having a high surface pressing force. This gives rise to an excellent stripping effect, concurrent with low friction.

FIG. 1 shows a wiper 1 for the sealing arrangement of a cylinder arrangement having a cylinder 2 and a piston rod 3. In this embodiment, the cylinder arrangement is a hydraulic cylinder arrangement having a hydraulic cylinder and a piston rod. The wiper 1 here forms the closure of the sealing arrangement towards the surroundings 11. The wiper 1 is installed in a groove 14 of the cylinder 2 and, under a radial pretension, comes into contact with the piston rod 3 linearly along a closed line.

The wiper 1 comprises a support lip 4 facing in the direction of the space that is to be sealed off, and a wiper lip 5 facing towards the surroundings. The support lip 4 and the wiper lip 5 are arranged on a holding element 6, whereby the support lip 4 protrudes in the direction of the space that is to be sealed off while the wiper lip 5 protrudes from the holding element 6 towards the surroundings.

The wiper lip 5 is bent at its free end in the direction of the piston rod 3. In this manner, the wiper lip forms a shoulder with the piston rod 3 before the contact zone, which shoulder, in an unassembled state, preferably extends in a radial plane of the wiper 1. The shoulder from the wiper lip 5 preferably extends out of the radial plane by an angle of from 115° to 150°. In this situation, an angle W1 of 30° results between the shoulder and the wiper lip 5 at an angle of 130° and, correspondingly, an angle W1 of 65° results from an angle of 115°.

As an alternative, it is likewise conceivable for the free end of the wiper lip 5 to have a thickened section facing in the direction of the piston rod 3. Altogether, this configuration ensures that the area of the free end of the wiper lip 5 comes into contact with the piston rod 3. The free end of the wiper lip 5 can taper to form a point, resulting in a linear contact surface on the piston rod 3.

The wiper 1 is made of polyurethane and is configured in one piece. The material is selected in such a way as to have a hardness of 98 Shore A.

The ratio of the length L to the mean thickness of the wiper lip 5 in this embodiment is 7 to 1. In its unstressed state, the wiper lip 5 is bent by an angle of 48° starting from the radial plane. The advantageous effect of the wiper lip 5 comes to the fore when the angle W1 is between 30° and 65°. The support lip 4 is bent by an angle W2 of 33° starting from the radial plane. Here, the advantageous effect ensues when the angle W2 is between 30° and 65°. Moreover, the wiper lip 5 is configured in such a way that the thickness S at the free end of the wiper lip 5 is smaller than the initial thickness K of the wiper lip 5 in the area of the holding element 6. Preferably, the ratio of the thickness K to the thickness S is 1.1 to 1.2. Alternatively, the thickness S can also be the same as the thickness K. The mean thickness of the wiper lip 5 results from the arithmetic mean of the thickness S and the thickness K.

The fact that the wiper lip 5 is bent at its free end in the direction of the piston rod 3 results in a section 15 that faces the radial plane in the unstressed state. In this embodiment, the ratio of the length L of the wiper lip 5 to the length C of the section 15 is 5. Preferably, the L-to-C ratio is between 4:1 and 15:1.

The holding element 6 has a relief groove 7 between the support lip 4 and the wiper lip 5.

On its side 12 facing away from the lips, the holding element 6 is provided with encircling projections that are configured in the form of a bead. The holding element 6 is supported in the groove 14 of the cylinder 2 via the projections 13.

Figure 2:
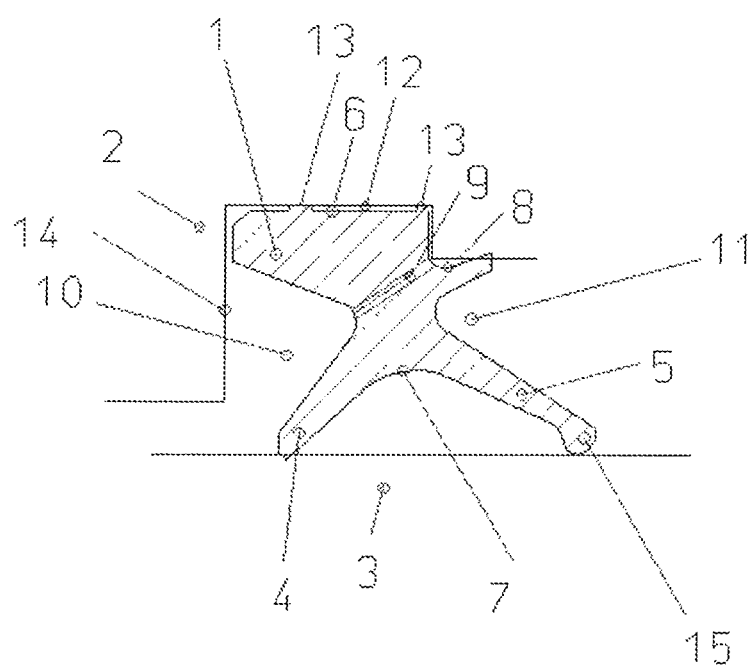
FIG. 2 a wiper with a pressure-relief lip and a cutout, in a sectional view.

FIG. 2 shows a wiper according to FIG. 1, whereby in this embodiment, a pressure-relief lip 8 further protrudes from the holding element 6 and its free end is supported on the cylinder 2. Moreover, the holding element 6 has a cutout 9 in the form of a hole which creates a connection between the side 10 facing the sealing arrangement and the side 11 facing the surroundings. Since the pressure-relief lip 8 comes into contact with the cylinder 2, medium is only exchanged if the pressure in the sealing space has exceeded a prescribed value, as a result of which the pressure-relief lip 8 is lifted off the cylinder 2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A wiper for a sealing arrangement of a cylinder arrangement having a cylinder and a piston rod, the wiper comprising:
   a support lip facing in a direction of a space that is to be sealed off;
   a wiper lip facing towards surroundings; and
   a holding element from which the support lip and the wiper lip protrude,
   wherein a free end of the wiper lip is bent in a direction of the piston rod,
   wherein a ratio of a length to a mean thickness of the wiper lip is greater than 5, and
   wherein a ratio of a length of the wiper lip from its center base to a point where the wiper lip is bent, to a length of the wiper lip from the point where the wiper lip is bent to its tip, is in a range of from 4:1 to 15:1.

2. The wiper of claim 1, wherein the free end of the wiper lip includes a shoulder.

3. The wiper of claim 2, wherein, in an unassembled state, the shoulder extends in a radial plane.

4. The wiper of claim 1, wherein the free end of the wiper lip includes a thickening in a direction of the piston rod.

5. The wiper of claim 1, wherein a ratio of a length to a mean thickness of the wiper lip is between 7 and 8.

6. The wiper of claim 2, wherein the ratio of the length to the mean thickness of the wiper lip is between 7 and 8.

7. The wiper of claim 1, made of a material comprising polyurethane.

8. The wiper of claim 1, made of polyurethane.

9. The wiper of claim 1, wherein a hardness of a material of the wiper is greater than 95 Shore A.

10. The wiper of claim 1, wherein a hardness of a material of the wiper is 98 Shore A.

11. The wiper of claim 1, wherein the holding element includes a relief groove between the support lip and the wiper lip.

12. The wiper of claim 1, wherein part of the holding element forms a pressure-relief lip whose free end is supported on the cylinder.

13. The wiper of claim 1, wherein the holding element includes a cutout which creates a connection between a side facing the sealing arrangement and a side of the holding element facing the surroundings.

14. The wiper of claim 1, wherein the holding element includes projections on a side facing away from the lips.

15. The wiper of claim 1, wherein the wiper lip is arranged linearly with respect to the piston rod.

16. The wiper of claim 1, wherein the free end of the wiper lip tapers to form a point.

17. A hydraulic cylinder arrangement, comprising:
   a hydraulic cylinder; and a
   piston rod,
   a sealing unit, arranged between the hydraulic cylinder and the piston rod,
   wherein the sealing unit includes the wiper of claim 1,
   wherein the wiper forms an end of the sealing unit in a direction of the environment,
   wherein the wiper is arranged in a groove of the hydraulic cylinder, and wherein, under a radial pretension, the wiper comes into contact with the piston rod linearly along a closed line.

19. The wiper of claim 1, wherein, in an unstressed state, the free end of the wiper lip extends radially farther than a free end of the support lip, in a direction antiparallel to an orthogonal of a plane of a side of the wiper facing away from the lips.

19. The wiper of claim 1, wherein an angle between the wiper lip and the support lip is in a range of from 30° to 130°.

* * * * *